(12) United States Patent
Katayama (10) Patent No.: US 7,755,991 B2
(45) Date of Patent: Jul. 13, 2010

(54) METHOD FOR DETECTING RADIAL TILT OF OPTICAL RECORDING MEDIUM IN OPTICAL HEAD DEVICE, OPTICAL HEAD DEVICE, AND OPTICAL INFORMATION RECORDING/REPRODUCING DEVICE

(75) Inventor: Ryuichi Katayama, Tokyo (JP)

(73) Assignee: NEC Corporation, Tokyo (JP)

( * ) Notice: Subject to any disclaimer, the term of this patent is extended or adjusted under 35 U.S.C. 154(b) by 1487 days.

(21) Appl. No.: 10/437,915

(22) Filed: May 15, 2003

(65) Prior Publication Data
US 2003/0218949 A1  Nov. 27, 2003

(30) Foreign Application Priority Data
May 23, 2002  (JP)  ............................. 2002-149074

(51) Int. Cl.
*G11B 7/00* (2006.01)
(52) U.S. Cl. .............................. 369/53.19; 369/112.05; 369/44.32
(58) Field of Classification Search ........................ None
See application file for complete search history.

(56) References Cited

U.S. PATENT DOCUMENTS

| | | | | |
|---|---|---|---|---|
| 5,483,512 | A * | 1/1996 | Yanagawa | 369/53.19 |
| 5,751,680 | A | 5/1998 | Ishibashi et al. | |
| 5,898,654 | A * | 4/1999 | Shimada et al. | 369/44.32 |
| 6,246,648 | B1 * | 6/2001 | Kuribayashi | 369/44.32 |
| 6,259,665 | B1 * | 7/2001 | Nagasato | 369/53.19 |
| 6,418,104 | B1 * | 7/2002 | Sato et al. | 369/53.19 |
| 6,507,544 | B1 | 1/2003 | Ma et al. | |
| 6,894,958 | B2 | 5/2005 | Katayama | |
| 7,095,693 | B2 * | 8/2006 | Sasaki et al. | 369/53.15 |
| 2001/0036137 | A1 | 11/2001 | Katayama | |
| 2002/0006091 | A1 | 1/2002 | Ma et al. | |
| 2002/0126588 | A1 | 9/2002 | Katayama | |
| 2002/0141301 | A1 | 10/2002 | Ohnishi et al. | |

FOREIGN PATENT DOCUMENTS

| | | |
|---|---|---|
| JP | 62-067737 | 3/1987 |
| JP | 3-037837 | 2/1991 |

(Continued)

OTHER PUBLICATIONS

Katayama et al., "Radial Tilt Detection Using 3-Beam Optical Head", Proceedings of SPIE, vol. 4090, published 2000, pp. 309-318.*

*Primary Examiner*—Peter Vincent Agustin
(74) *Attorney, Agent, or Firm*—Foley & Lardner LLP (57) ABSTRACT

The light emitted from a semiconductor laser is divided by a diffractive optical element into three light beams which are 0th-order light as the main beam and ±1st-order diffracted lights as the sub-beams, and the track error signals by the main beam and the sub-beams are detected, respectively, by a differential phase detection method. By the effect of the diffractive optical element, the light intensity distributions of the main beam and the sub-beams become different when making incidence on an objective lens. Therefore, when there is radial tilt in a disk, the phases of the track error signals by the main beam and the sub-beams are shifted with each other. Based on the shift in the phases of the track error signals, radial tilt of the disk is detected.

4 Claims, 9 Drawing Sheets

FOREIGN PATENT DOCUMENTS

| | | |
|---|---|---|
| JP | 09-161293 | 6/1997 |
| JP | 2000-082226 | 3/2000 |
| JP | 2001-110074 | 4/2001 |
| JP | 2001-23666 | 8/2001 |
| JP | 2001-307358 | 11/2001 |
| JP | 2001-357555 | 12/2001 |

\* cited by examiner

METHOD FOR DETECTING RADIAL TILT OF OPTICAL RECORDING MEDIUM IN OPTICAL HEAD DEVICE, OPTICAL HEAD DEVICE, AND OPTICAL INFORMATION RECORDING/REPRODUCING DEVICE

BACKGROUND OF THE INVENTION

1. Field of the Invention

The present invention relates to a method for detecting radial tilt of an optical recording medium in an optical head device for performing recording/reproducing on an optical recording medium, an optical head device, and an optical information recording/reproducing device. More specifically, it relates to a method for detecting radial tilt of an optical recording medium in an optical head device, which is capable of detecting radial tilt of a read-only type optical recording medium, an optical head device, and an optical information recording/reproducing device.

2. Description of the Related Art

The recording density in an optical information recording/reproducing device is inversely proportional to the square of the diameter of focused spot which is formed on an optical recording medium by an optical head device. Thus, the smaller the diameter of the focused spot is, the larger the recording density becomes. The diameter of the focused spot is inversely proportional to the numerical aperture of an objective lens in the optical head device. Thus, the higher the numerical aperture of the objective lens is, the smaller the diameter of the focused spot becomes.

On the other hand, when the optical recording medium tilts against the objective lens in the radial direction, the shape of the focused spot becomes disturbed due to coma aberration caused by a substrate of the optical recording medium so that the recording/reproducing characteristics become deteriorated. The coma aberration is inversely proportional to the cube of the numerical aperture of the objective lens. Thus, the higher the numerical aperture of the objective lens is, the narrower the margin of the tilt (radial tilt) of the optical recording medium in the radial direction for the recording/reproducing characteristics becomes.

Therefore, in the optical head device with an increased numerical aperture of the objective lens for increasing the recording density, it is necessary to detect and correct the radial tilt of the optical recording medium in order not to deteriorate the recording/reproducing characteristics.

Figures 9A, 9B:
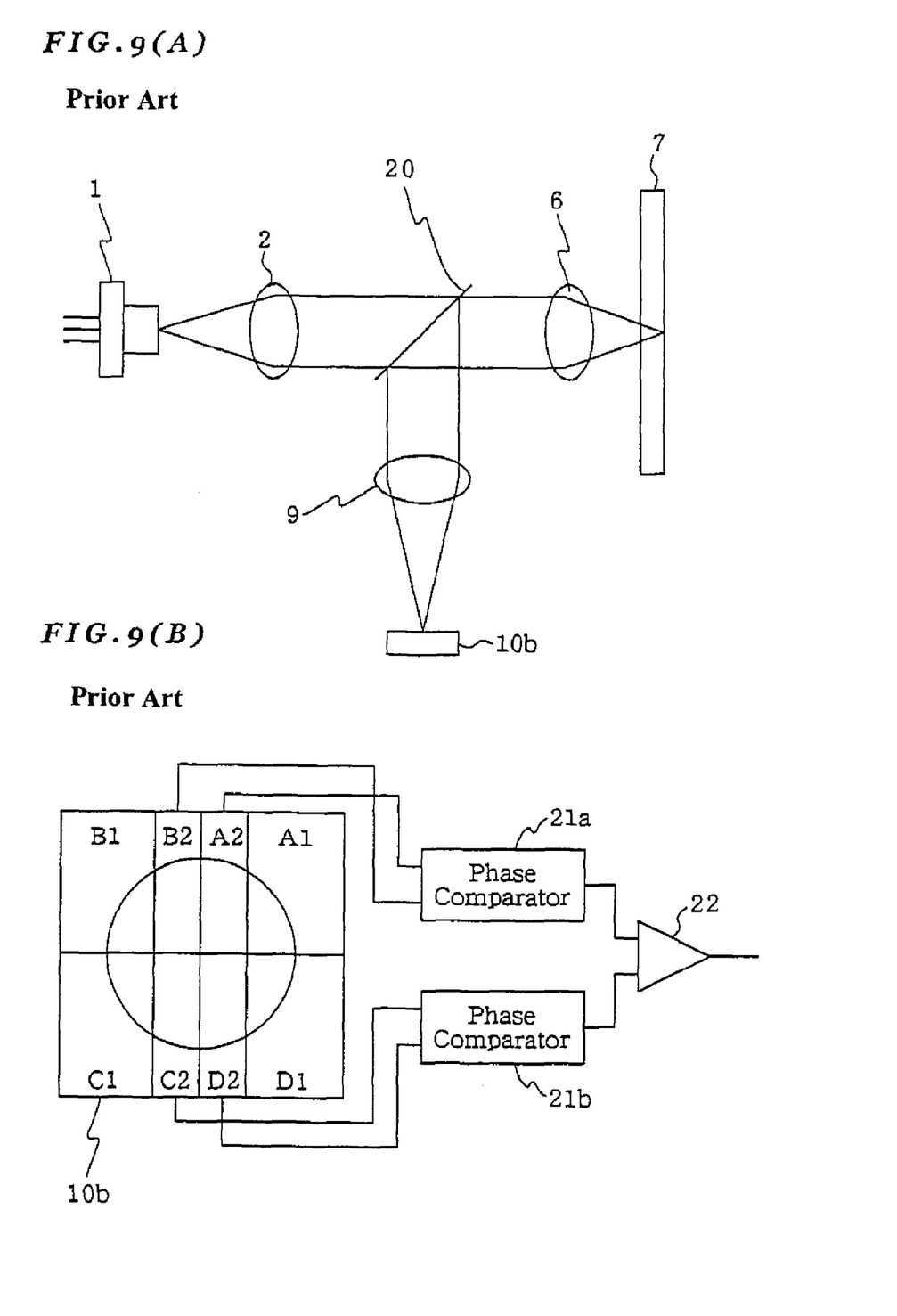
FIG. 9(A) is a block diagram showing a conventional optical head device.
FIG. 9(B) is a block diagram showing a pattern of light receiving sections of a photodetector and a circuit for detecting radial tilt of a disk in a conventional optical head device.

FIG. 9(A) shows the structure of a conventional optical head device capable of detecting radial tilt of a read-only type optical recording medium.

This optical head device is disclosed in Japanese Patent Application Laid-open No. 2001-110074. The light emitted from a semiconductor laser 1 is collimated by a collimator lens 2, and a part of the emitted light transmits through a beam splitter 20 to be focused on a disk 7 by an objective lens 6.

The reflected light from the disk 7 inversely transmits through the objective lens 6, and a part of which is reflected by the beam splitter 20 and transmits through a lens 9 to be received by a photodetector 10b.

FIG. 9(B) shows both a pattern of a light receiving section of the photodetector 10b and the structure of a circuit for detecting radial tilt of a disk 7. The light receiving section of the photodetector 10b is divided into eight light receiving sections A1, A2, B1, B2, C1, C2, D1, and D2 by three division lines parallel to tangential direction of the disk 7 and a division line parallel to the radial direction. The phase difference of the signals outputted from the light receiving sections A2, B2 and the phase difference of the signals outputted from the light receiving sections C2, D2 are obtained by phase comparators 21a and 21b, respectively. The obtained values are added using an adder 22 to detect radial tilt of the disk 7.

In the conventional optical head device, the reflected light from the disk 7 is received by the eight light receiving sections. Therefore, compared to an ordinary optical head device in which reflected light from an optical recording medium is received by four light receiving sections and which does not detect radial tilt, there requires twice the number of the current-voltage conversion circuits for converting the current outputted from the light receiving sections to voltage. When the number of the current-voltage conversion circuits increases, noise caused by the circuit increases thereby reducing the signal to noise ratio of an RF signal.

SUMMARY OF THE INVENTION

An object of the present invention is to provide a method for detecting radial tilt of an optical recording medium in an optical head device, optical head device and an optical information recording/reproducing device, which can obtain excellent signal to noise ratio of the RF signal, through overcoming the above-described problems in a conventional optical head device which is capable of detecting radial tilt of a read-only type optical recording medium.

In order to achieve the foregoing object, a method for detecting radial tilt of an optical recording medium in an optical head device according to the present invention comprises: a first step of dividing emitted light from a light source into main beam and sub-beam by a diffractive optical element; a second step of focusing the main beam and the sub-beam onto an optical recording medium; and a third step of receiving the main beam and the sub-beam by respective light receiving sections corresponding to four portions of the beams which are reflected by the optical recording medium.

Further, in the third step, the main beam and the sub-beam are received by four light receiving sections which are divided by a division line parallel to the tangential direction of the optical recording medium passing through optical axis and a division line parallel to the radial direction. In the third step, it is desirable to have such configuration that by the differential phase detection method, track error signal by the main beam be obtained based on phases of signals outputted from the four light receiving sections corresponding to the main beam and, by the differential phase detection method, track error signal by the sub-beam be obtained based on phases of signals outputted from the four light receiving sections corresponding to the sub-beam so as to detect radial tilt of the optical recording medium based on the track error signal by the main beam and the track error signal by the sub-beam.

Further, the optical head device according to the present invention comprises: a light source for emitting light; a diffractive optical element for dividing light emitted from the light source into a main beam and a sub-beam; an objective lens for focusing the main beam and the sub-beam onto an optical recording medium; and a photodetector for receiving light reflected by the optical recording medium. The photodetector comprises a first light receiving section for receiving the main beam in four divided portions and a second light receiving section for receiving the sub-beam in four divided portions.

In the optical head device of the present invention, when there is no radial tilt in the optical recording medium, the positions of the peaks of the focused spots by the main beam and the sub-beam in the radial direction of the optical recording medium coincide with each other. Therefore, the phases of the track error signals by the main beam and the sub-beam coincide with each other when the focused spots cross the track of the optical recording medium in the radial direction. On the other hand, when there is radial tilt in the optical recording medium, the peak of the focused spot in the radial direction of the optical recording medium is shifted due to coma aberration caused by a substrate of the optical recording medium. The intensity distributions of the main beam and the sub-beam when making incidence on the objective lens differ so that the amount of shift in the peak of the focused spot by the coma aberration differs. Thus, the positions of the peaks of the focused spots by the main beam and the sub-beam in the radial direction of the optical recording medium are shifted with each other. As a result, there is phase shift between the track error signal by the main beam and that by the sub-beam. Radial tilt of the optical recording medium is detected based on the shift in the phases of the track error signals.

The optical information recording/reproducing device of the present invention comprises the optical head device of the present invention as described and a correcting means for correcting radial tilt of the optical recording medium. In the optical information recording/reproducing device of the present invention, the radial tilt of the optical recording medium is corrected so as to prevent adverse effect on the recording/reproducing characteristics using the optical head device of the present invention as described.

When detecting the radial tilt of the optical recording medium in the optical head device and the optical information recording/reproducing device of the present invention, the main beam used for detecting the RF signal from the optical recording medium can be received by the four light receiving sections. Therefore, the number of current-voltage conversion circuits for the main beam is the same as that in an ordinary optical head device which does not detect radial tilt. As a result, there is no increased noise due to the circuit thereby achieving excellent signal to noise ratio of the RF signal.

Next, it will be described in short by referring to FIG. 1. Light emitted from a semiconductor laser 1 is divided into three light beams, which are 0th-order light as the main beam and ±1st-order diffracted lights as the sub-beams, and track error signals from each of the main beam and the sub-beams are obtained by a differential phase detection method. By the effect of a diffractive optical element 3a, the intensity distributions of the main beam and the sub-beams differ when making incidence on an objective lens 6. Therefore, when there is radial tilt in a disk 7, the phases of the track error signals by the main beam and the sub-beams are shifted with each other. Based on the phase shift of the track error signals, the radial tilt of the disk 7 is detected. Thereby, it becomes possible to achieve an excellent signal to noise ratio of the RF signal when detecting the radial tilt of read-only type optical recording medium.

DETAILED DESCRIPTION OF THE PREFERRED EMBODIMENTS

Preferred embodiments of the present invention will now be described while referring to the accompanying drawings.

Figure 1A:
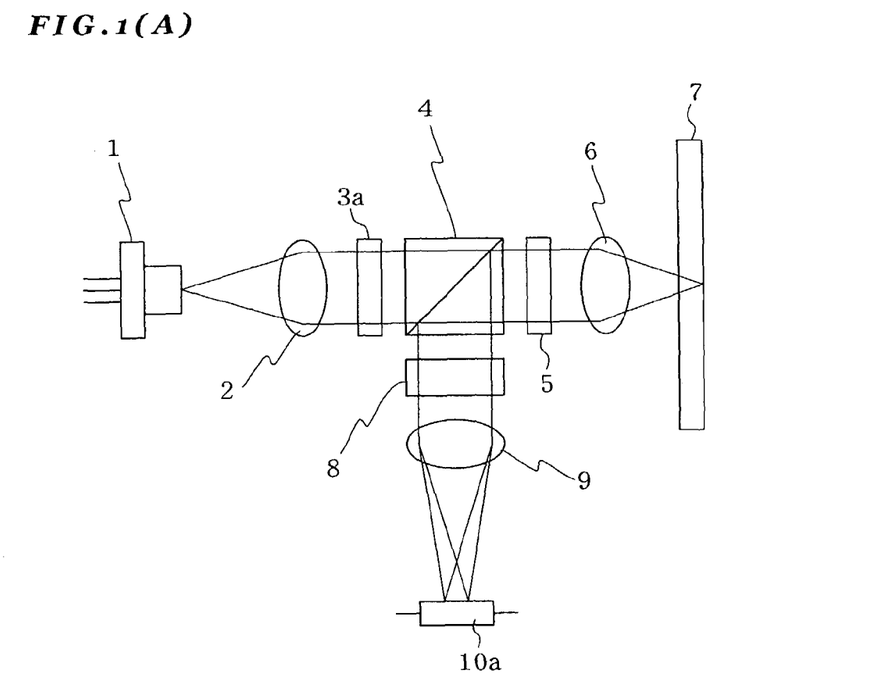
FIG. 1(A) is a block diagram showing a first embodiment of an optical head device according to the present invention.

FIG. 1(A) shows a first embodiment of an optical head device according to the present invention. Light emitted from a semiconductor laser 1 is collimated by a collimator lens 2. The collimated light is then divided into three light beams by a diffractive optical element 3a which are 0th-order light as a main beam and ±1st-order diffracted lights as sub-beams. The light beams enter a polarizing beam splitter 4 as P polarized light and substantially 100% transmit therethrough. Then, they transmit through quarter-wave plate 5 to be converted from linearly polarized light to circularly polarized light thereby to be focused onto a disk 7 by an objective lens 6.

Three light beams reflected from the disk 7 transmit inversely through the objective lens 6 and then transmit the quarter-wave plate 5 to be converted from the circularly polarized light to linearly polarized light whose polarization direction is orthogonal to that in the outward path. The light beams then enter the polarizing beam splitter 4 as S polarized light and substantially 100% is reflected thereby to be received by a photodetector 10a through a cylindrical lens 8 and lens 9. The photodetector 10a is placed between the two focal lines of the cylindrical lens 8 and lens 9.

Figure 1B:
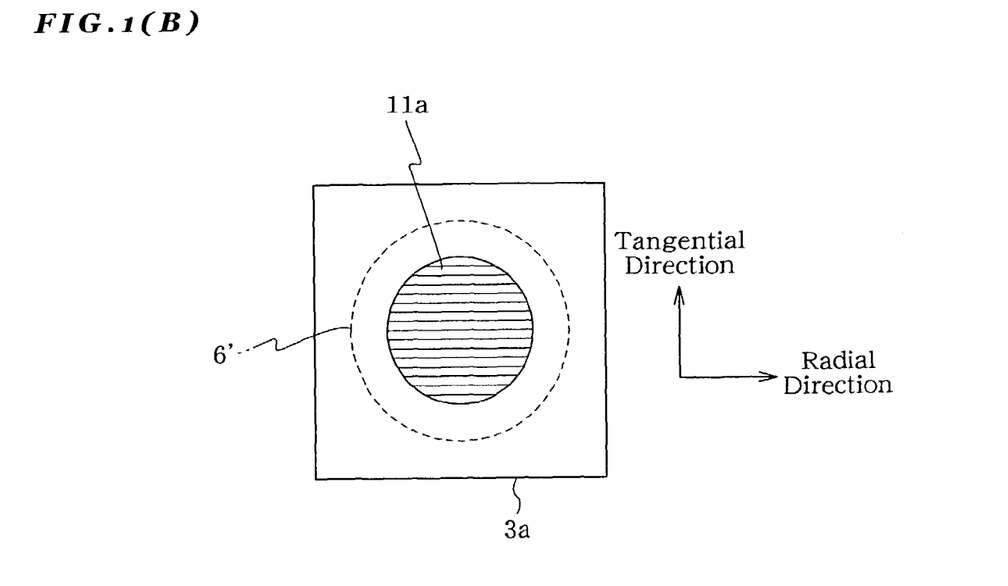
FIG. 1(B) is a plan view showing a diffractive optical element in the first embodiment of the optical head device according to the present invention.

FIG. 1(B) is a plan view of the diffractive optical element 3a. The diffractive optical element 3a has a structure in which diffraction gratings are formed only in a region 11a inside a circle with a diameter smaller than an effective diameter 6' of the objective lens 6 shown by a dotted line in the figure. The direction of the lattice in the diffraction gratings is parallel to the radial direction of the disk 7 and its pattern is in a linear form at even intervals.

The phase difference between the line portion and the space portion of the diffraction gratings is, for example, $0.5\pi$, so that substantially 50.0% of the light which has entered the region 11a transmits therethrough as 0th-order light and about 20.3% each is diffracted thereby as ±1st-order diffracted lights. Also, substantially 100% of the light which has entered the outside of the region 11a transmits therethrough. In other words, the main beam from the diffractive optical element 3a contains the light transmitted through both the inside and outside of the region 11a, while the sub-beams from the diffractive optical element 3a contain only the light diffracted by the inside of the region 11a. As a result, the distributions of the light intensity for the main beam and the sub-beams differ when making incidence on the objective lens 6. Specifically, the peripheral light intensity of the sub-beams is lower than that of the main beam.

Figure 2A:
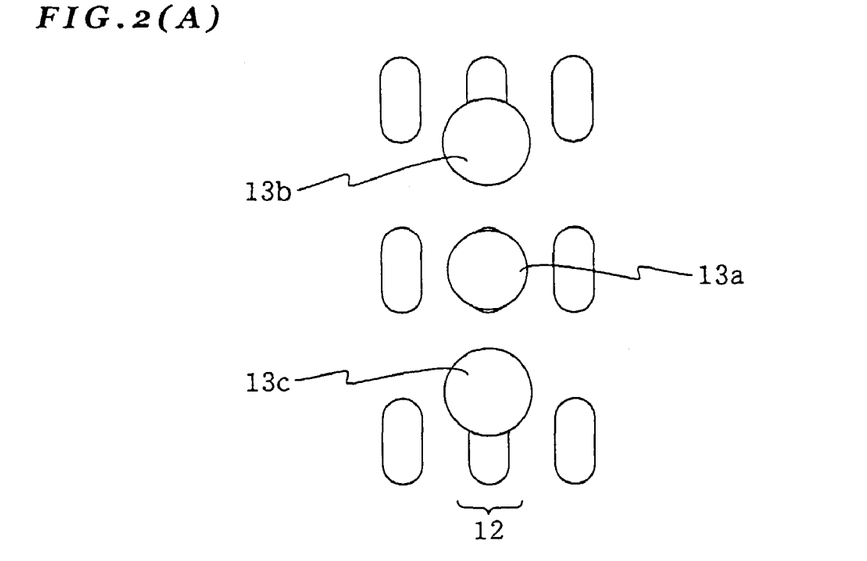
FIG. 2(A) is a plan view showing the configuration of focused spots on a disk in the first embodiment of the optical head device according to the present invention.

FIG. 2(A) shows the configuration of the focused spots on the disk 7. The focused spots 13a, 13b, and 13c correspond to 0th-order light, +1st-order diffracted light, and −1st-order diffracted light from the diffractive optical element 3a, respectively, which are arranged on a same track 12 to which pits are formed. The peripheral light intensity of the sub-beams is lower than that of the main beam so that the diameters of the focused spots 13b and 13c as the sub-beams are larger than that of the focused spot 13a as the main beam.

Figure 2B:
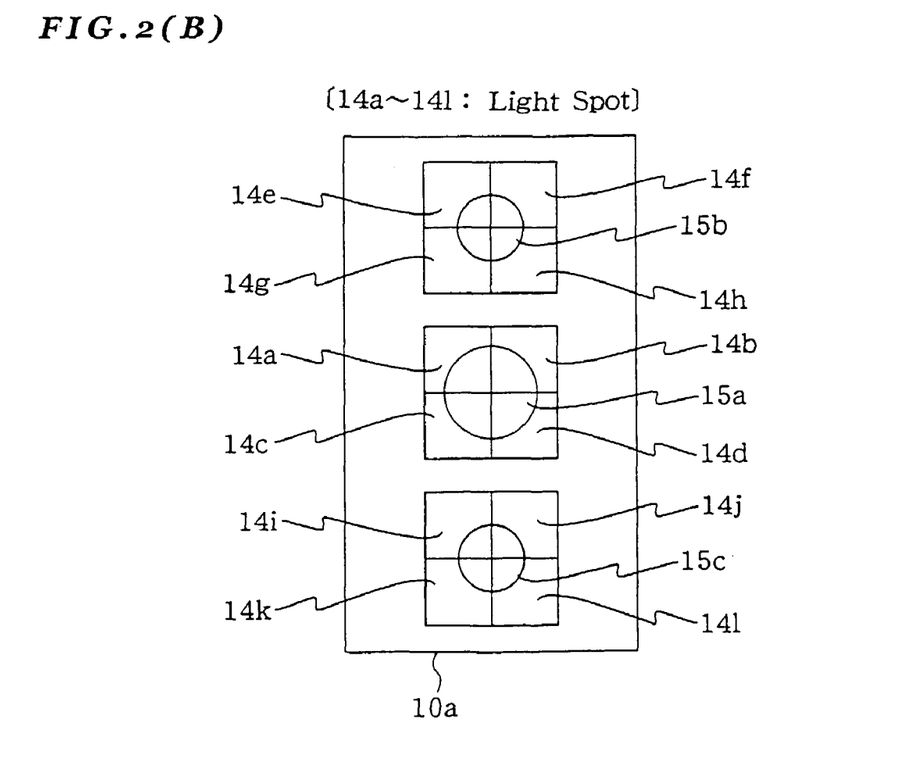
FIG. 2(B) is a plan view showing a pattern of light receiving sections of a photodetector and the configuration of the light spots on the photodetector in the first embodiment of the optical head device according to the present invention.

FIG. 2(B) shows the pattern of the light receiving sections of the photodetector 10a and the configuration of the light spots on the photodetector 10a. A light spot 15a corresponds to 0th-order light from the diffractive optical element 3a, and is received by four divided light receiving sections 14a to 14d which are divided by division line parallel to the tangential direction of the disk passing through the optical axis and the division line parallel to the radial direction. A light spot 15b corresponds to +1st-order diffracted light from the diffractive optical element 3a, and is received by four divided light receiving sections 14e to 14h which are divided by division line parallel to the tangential direction of the disk passing through the optical axis and the division line parallel to the radial direction. A light spot 15c corresponds to −1st-order diffracted light from the diffractive optical element 3a, and is received by four divided light receiving sections 14i to 14l which are divided by division line parallel to the tangential direction of the disk passing through the optical axis and the division line parallel to the radial direction. The row of the focused spots 13a, 13b, 13c on the disk 7 is in the tangential direction, however, the row of the light spots 15a, 15b, 15c on the photodetector 10a is in the radial direction due to the effect of the cylindrical lens 8 and the lens 9. The peripheral light intensity of the light spots 15b and 15c as the sub-beams is lower than that of the light spot 15a as the main beam.

Provided that the output values from the light receiving sections 14a to 14l are denoted by V14a to V14l, respectively, the focus error signal is obtained by an astigmatism method from an arithmetic expression of (V14a+V14d)−(V14b+V14c). The track error signal by the focused spot 13a as the main beam is obtained by a differential phase detection method from the phase difference between (V14a+V14d) and (V14b+V14c). The track error signals by the focused spots 13b, 13c as the sub-beams are obtained by the differential phase detection method from the sum of the phase differences between (V14e+V14h) and (V14f+V14g), and between (V14i+V14l) and (V14j+V14k). Further, the RF signal by the focused spot 13a as the main beam is obtained from an arithmetic expression of V14a+V14b+V14c+V14d.

In FIG. 2(B), it is so described that the main beam and the sub-beams are received by the light receiving sections divided by the division line parallel to the tangential direction of the optical recording medium passing through the optical axis and the division line parallel to the radial direction. However, it is not limited to this. For example, the main beam and the sub-beams may be divided into four beams by a diffractive optical element etc. to be received by light receiving sections corresponding to the four divided beams.

Figure 3A:
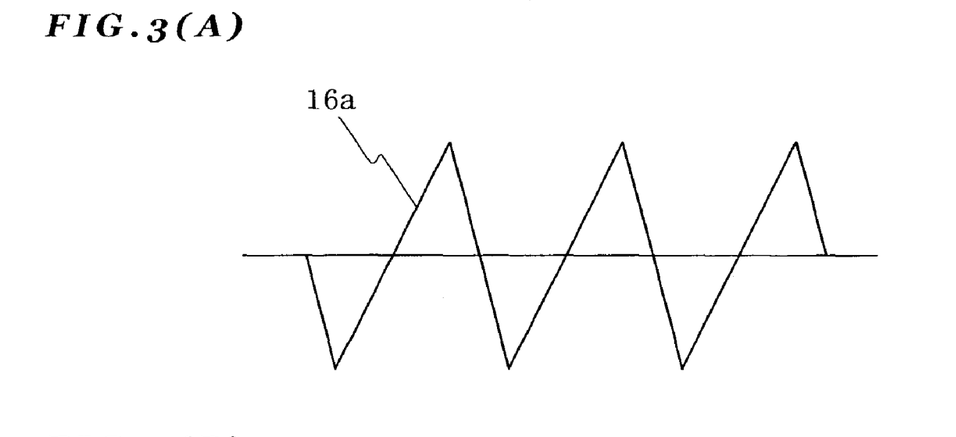
FIGS. 3(A) to 3(C) are waveform diagrams showing various track error signals in regard to detection of radial tilt of the disk in the first embodiment of the optical head device according to the present invention.
Figure 3B:
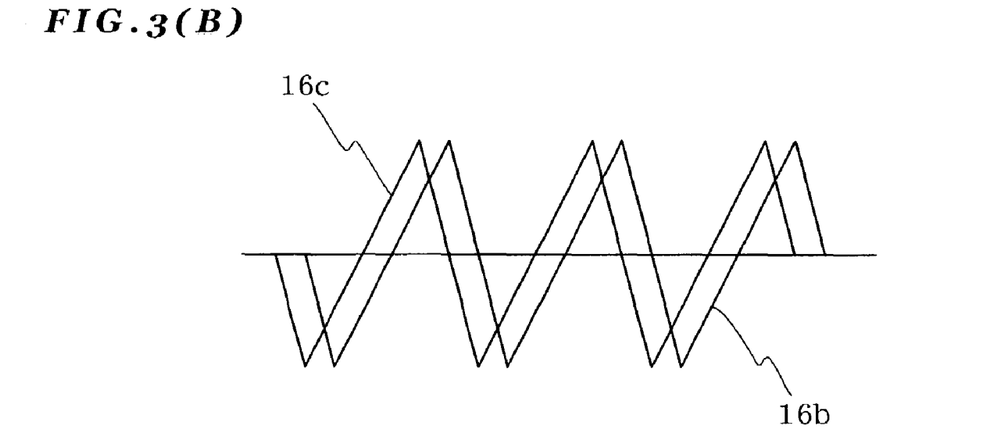
Figure 3C:
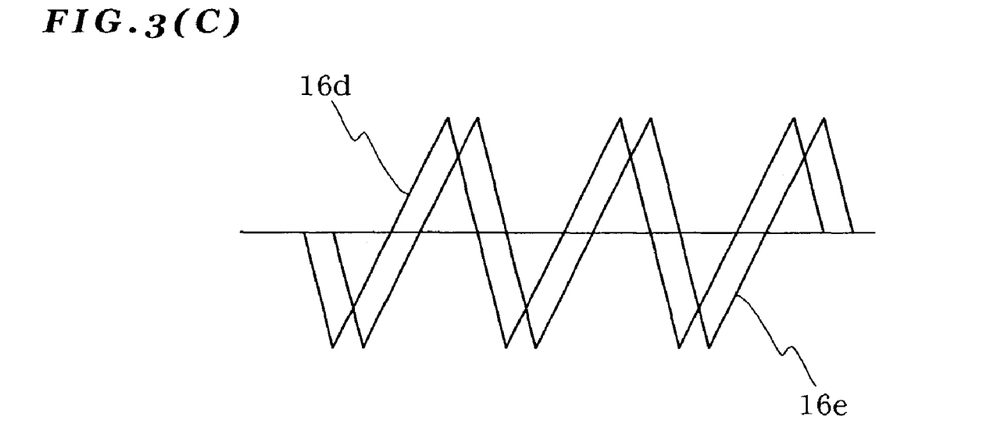

FIG. 3 shows various track error signals in regard to detection of radial tilt of the disk 7. In FIG. 3, the horizontal axis represents the off-track amount of the disk 7 and the vertical axis represents the track error signals.

Track error signal 16a shown in FIG. 3(A) is the track error signal by the focused spots 13a, 13b, 13c when there is no radial tilt in the disk 7.

On the contrary, track error signal 16b shown in FIG. 3(B) is the track error signal by the focused spot 13a when there is positive radial tilt in the disk 7, while track error signal 16c is the track error signal by the focused spots 13b, 13c when there is positive radial tilt in the disk 7.

Track error signal 16d shown in FIG. 3(C) is the track error signal by the focused spot 13a when there is negative radial tilt in the disk 7, while track error signal 16e is the track error signal by the focused spots 13b, 13c when there is negative radial tilt in the disk 7.

The position where the track error signal by the focused spot 13a crosses zero point from negative area to positive area corresponds to that on the track. When there is no radial tilt in the disk 7, the phase of the track error signal by the focused spots 13b, 13c coincides with that of the track error signal by the focused spot 13a, so that the track error signal by the focused spots 13b, 13c becomes zero on the track.

On the contrary, when there is positive radial tilt in the disk 7, the phase of the track error signal by the focused spots 13b, 13c is shifted towards the left side in the figure with respect to the phase of the track error signal by the focused spot 13a, so that the track error signal by the focused spots 13b, 13c becomes positive on the track.

Further, when there is negative radial tilt in the disk 7, the phase of the track error signal by the focused spots 13b, 13c is shifted towards the right side in the figure with respect to the phase of the track error signal by the focused spot 13a, so that the track error signal by the focused spots 13b, 13c becomes negative on the track.

Therefore, the track error signal by the sub-beams at the time of applying track servo using the track error signal by the main beam can be used as radial tilt signal.

Figure 4A:
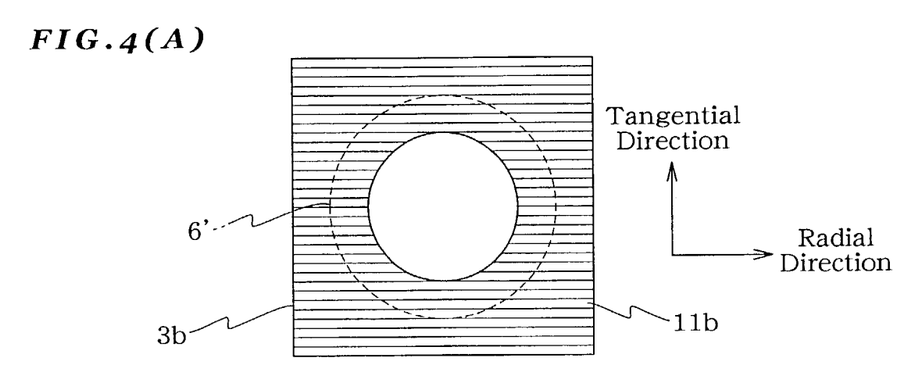
FIG. 4(A) is a plan view showing a diffractive optical element in a second embodiment of an optical head device according to the present invention.

In a second embodiment of an optical head device according to the present invention, the diffractive optical element 3a in the first embodiment is replaced with a diffractive optical element 3b. FIG. 4(A) shows a plan view of the diffractive optical element 3b. The diffractive optical element 3b has the structure in which diffraction gratings are formed only in a region 11b outside a circle with a diameter smaller than the effective diameter 6' of the objective lens 6 shown by a dotted line in the figure. The direction of the lattice in the diffraction gratings is parallel to the radial direction of the disk 7 and its pattern is in a linear form at even intervals.

The phase difference between the line portion and the space portion of the diffraction gratings is, for example, $0.5\pi$, so that substantially 50.0% of the light which has entered the region 11b transmits therethrough as 0th-order light and about 20.3% each is diffracted thereby as ±1st-order diffracted lights. Also, substantially 100% of the light which has entered the outside of the region 11b transmits therethrough. In other words, the main beam from the diffractive optical element 3b contains the light transmitted through both the inside and outside of the region 11b, while the sub-beams from the diffractive optical element 3b contain only the light diffracted by the inside of the region 11b. As a result, the distributions of the light intensity for the main beam and the sub-beams differ when making incidence on the objective lens 6. Specifically, the peripheral light intensity of the sub-beams is higher than that of the main beam.

The configuration of the focused spots on the disk 7 according to the embodiment is substantially the same as that shown in FIG. 2(A). However, the peripheral light intensity of the sub-beams is higher than that of the main beam so that the focused spots as the sub-beams have a smaller diameter and a larger sidelobe compared to the focused spot as the main beam.

The pattern of the light receiving sections of the photodetector 10a and the configuration of the light spots on the photodetector 10a according to the embodiment are substantially the same as those shown in FIG. 2(B). However, the peripheral light intensity of the light spots as the sub-beams is higher than that of the light spot as the main beam.

In the second embodiment, the focus error signal, the track error signal, and the RF signal are obtained by the same method described in the first embodiment. Also, in the second embodiment, radial tilt of the disk 7 can be detected by the same method described in the first embodiment.

Figure 4B:
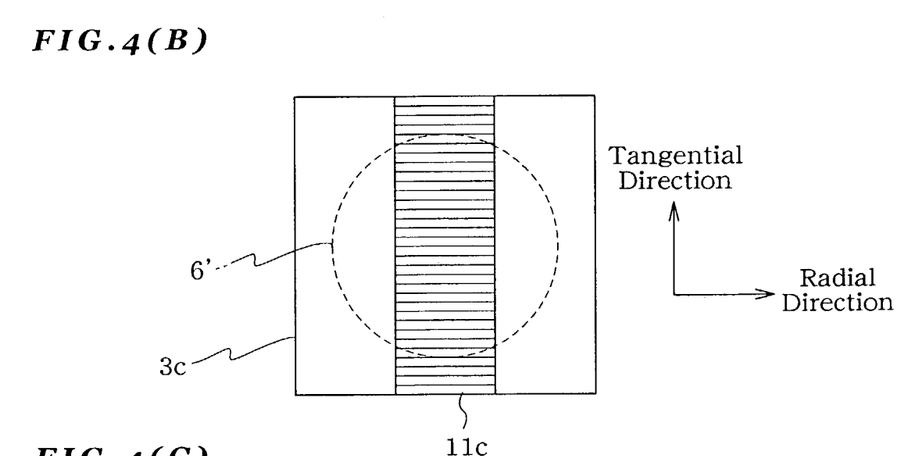
FIG. 4(B) is a plan view showing a diffractive optical element in a third embodiment of an optical head device according to the present invention.

In a third embodiment of an optical head device according to the present invention, the diffractive optical element 3a in the first embodiment is replaced with a diffractive optical element 3c. FIG. 4(B) shows a plan view of the diffractive optical element 3c. The diffractive optical element 3c has the structure in which diffraction gratings are formed only in a region 11c inside a band with a width smaller than the effective diameter 6' of the objective lens 6 shown by a dotted line in the figure. The direction of the lattice in the diffraction gratings is parallel to the radial direction of the disk 7 and its pattern is in a linear form at even intervals.

The phase difference between the line portion and the space portion of the diffraction gratings is, for example, $0.5\pi$, so that substantially 50.0% of the light which has entered the region 11c transmits therethrough as 0th-order light and about 20.3% each is diffracted thereby as ±1st-order diffracted lights. Also, substantially 100% of the light which has entered the outside of the region 11c transmits therethrough. In other words, the main beam from the diffractive optical element 3c contains the light transmitted through both the inside and outside of the region 11c, while the sub-beams from the diffractive optical element 3c contain only the light diffracted by the inside of the region 11c. As a result, the distributions of the light intensity for the main beam and the sub-beams differ when making incidence on the objective lens 6. Specifically, the peripheral light intensity of the sub-beams in the radial direction of the disk 7 is lower than that of the main beam.

The configuration of the focused spots on the disk 7 according to the embodiment is substantially the same as that shown in FIG. 2(A). However, the peripheral light intensity of the sub-beams in the radial direction is lower than that of the main beam, so that the diameter of the focused spots as the sub-beams in the radial direction is larger than that of the focused spot as the main beam.

The pattern of the light receiving sections of the photodetector 10a and the configuration of the light spots on the photodetector 10a according to the embodiment are substantially the same as those shown in FIG. 2(B). However, the peripheral light intensity of the light spots as the sub-beams in the radial direction is lower than that of the light spot as the main beam.

In the third embodiment, the focus error signal, the track error signal, and the RF signal are obtained by the same method described in the first embodiment. Also, in the third embodiment, radial tilt of the disk 7 can be detected by the same method described in the first embodiment.

Figure 4C:
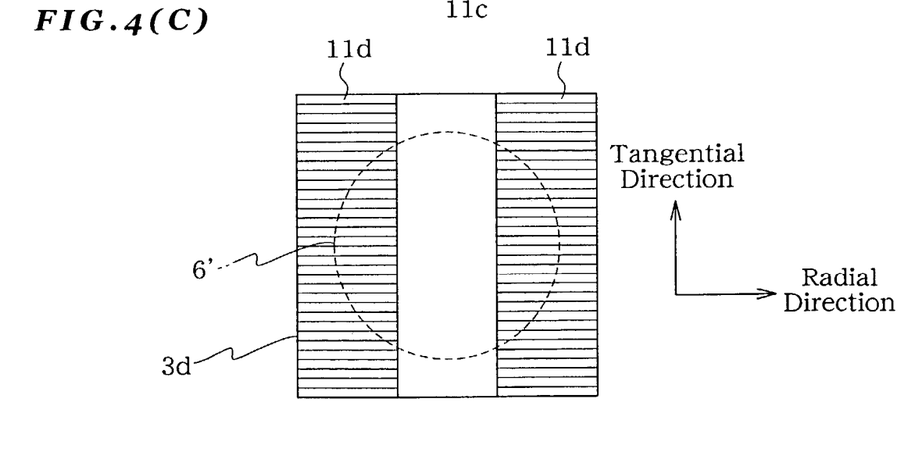
FIG. 4(C) is a plan view showing a diffractive optical element in a fourth embodiment of an optical head device according to the present invention.

In a fourth embodiment of an optical head device according to the present invention, the diffractive optical element 3a in the first embodiment is replaced with a diffractive optical element 3d. FIG. 4(C) shows a plan view of the diffractive optical element 3d. The diffractive optical element 3d has the structure in which diffraction gratings are formed only in a region 11d outside a band with a width smaller than the effective diameter 6' of the objective lens 6 shown by a dotted line in the figure. The direction of the lattice in the diffraction gratings is parallel to the radial direction of the disk 7 and its pattern is in a linear form at even intervals.

The phase difference between the line portion and the space portion of the diffraction gratings is, for example, $0.5\pi$, so that substantially 50.0% of the light entered the region 11d transmits therethrough as 0th-order light and about 20.3% each is diffracted thereby as ±1st-order diffracted lights. Also, substantially 100% of the light which has entered the outside of the region 11d transmits therethrough. In other words, the main beam from the diffractive optical element 3d contains the light transmitted through both the inside and outside of the region 11d, while the sub-beams from the diffractive optical element 3d contain only the light diffracted by the inside of the region 11d. As a result, the distributions of the light intensity for the main beam and the sub-beams differ when making incidence on the objective lens 6. Specifically, the peripheral light intensity of the sub-beams in the radial direction of the disk 7 is higher than that of the main beam.

The configuration of the focused spots on the disk 7 according to the embodiment is substantially the same as that shown in FIG. 2(A). However, the peripheral light intensity of the sub-beams in the radial direction is higher than that of the main beam, so that the focused spots as the sub-beams have a smaller diameter and a larger sidelobe in the radial direction compared to the focused spot as the main beam.

The pattern of the light receiving sections of the photodetector 10a and the configuration of the light spots on the photodetector 10a according to the embodiment are substantially the same as those shown in FIG. 2(B). However, the peripheral light intensity of the light spots as the sub-beams in the radial direction is higher than that of the light spot as the main beam.

In the fourth embodiment, the focus error signal, the track error signal, and the RF signal are obtained by the same method described in the first embodiment. Also, in the fourth embodiment, radial tilt of the disk 7 can be detected by the same method described in the first embodiment.

In the first to fourth embodiment, when there is residual error, caused by eccentricity of the disk 7 and the like, in the track error signal used for applying track servo, offset due to the residual error is also generated in the track error signal by the sub-beams as the radial tilt signal.

However, if the signal obtained by subtracting the track error signal used for applying the track servo from the track error signal by the sub-beams is used as the radial tilt signal, it is possible to detect radial tilt without generating offset in the radial tilt signal due to the residual error.

Figure 5A:
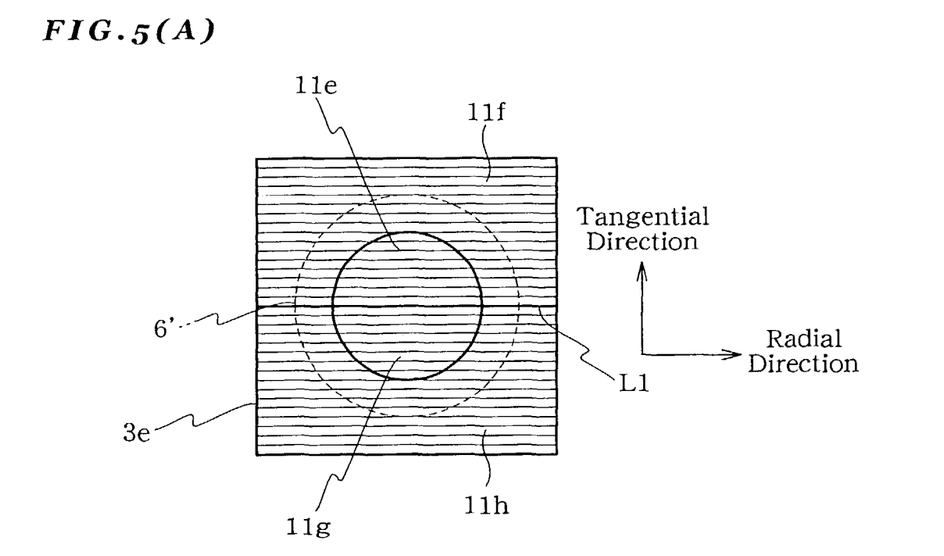
FIG. 5(A) is a plan view showing a diffractive optical element in a fifth embodiment of an optical head device according to the present invention.

In a fifth embodiment of an optical head device according to the present invention, the diffractive optical element 3a in the first embodiment is replaced with a diffractive optical element 3e. FIG. 5(A) is a plan view showing the diffractive optical element 3e. The diffractive optical element 3e has the following structure. Diffraction gratings, which are divided into two regions 11e, 11g by a straight line L1 parallel to the radial direction of the disk 7 passing through the optical axis of the incident light, are formed inside a circle with a diameter smaller than the effective diameter 6' of the objective lens 6 shown by a dotted line in the figure. Outside the circle, diffraction gratings, which are divided into two regions 11$f$, 11$h$ by a straight line L1 parallel to the radial direction of the disk 7 passing through the optical axis of the incident light, are formed.

The direction of all the lattices in the diffraction gratings is parallel to the radial direction of the disk 7, and their pattern is in a linear form at even intervals. The cross section of each lattice is serrated. If the phase difference between the top and the bottom of the saw teeth is, for example, $\pi$, substantially 40.5% of the light which has entered the regions 11$e$, 11$h$ transmits therethrough as 0th-order light and about 40.5% is diffracted thereby as +1st-order diffracted light. However, only about 4.5% is diffracted thereby as −1st-order diffracted light. Further, substantially 40.5% of the light which has entered the regions 11$f$, 11$g$ transmits therethrough as 0th-order light and about 40.5% is diffracted thereby as −1st-order diffracted light. However, only about 4.5% is diffracted thereby as +1st-order diffracted light. The facing direction of the saw teeth in the regions 11$e$, 11$h$ is so set that +1st-order diffracted light is deflected towards the upward direction in the figure, while the facing direction of the saw teeth in the regions 11$f$, 11$g$ is so set that −1st-order diffracted light is deflected towards the downward direction in the figure.

Provided that +1st-order diffracted light from the diffractive optical element 3$e$ is to be a sub-beam 1 and −1st-order diffracted light is to be a sub-beam 2, the main beam contains the light transmitted through the regions 11$e$, 11$f$, 11$g$, 11$h$ by the same proportion. The sub-beam 1 mainly contains only the light diffracted by the regions 11$e$, 11$h$, while the sub-beam 2 mainly contains only the light diffracted by the regions 11$f$, 11$g$. As a result, distributions of the light intensity for the main beam, the sub-beam 1, and the sub-beam 2 differ when making incidence on the objective lens 6. The peripheral light intensity in the top-half of the sub-beam 1 is lower than that of the main beam, while the bottom-half is higher. The peripheral light intensity in the top-half of the sub-beam 2 is higher than that of the main beam, while the bottom-half is lower. The sum of the light intensity distributions of the sub-beam 1 and the sub-beam 2 equals to the light intensity distribution of the main beam.

The configuration of the focused spots on the disk 7 according to the embodiment is substantially the same as that shown in FIG. 2(A). However, the diameter of the focused spots as the sub-beams and that of the focused spot as the main beam are substantially the same.

The pattern of the light receiving sections of the photodetector 10$a$ and the configuration of the light spots on the photodetector 10$a$ according to the embodiment are substantially the same as those shown in FIG. 2(B). However, in the left-half of the light spot as the sub-beam 1, the peripheral light intensity is lower than that of the light spot as the main beam, while the peripheral light intensity in the right-half is higher. In the left-half of the light spot as the sub-beam 2, the peripheral light intensity is higher than that of the light spot as the main beam, while the peripheral light intensity in the right-half is lower.

In the embodiment, the focus error signal, the track error signal, and the RF signal are obtained by the same method described in the first embodiment.

The track error signal by the focused spot as the main beam is as follows. When there is no radial tilt in the disk 7, it is the same as the track error signal 16$a$ shown in FIG. 3(A). When there is positive radial tilt in the disk 7, it is the same as the track error signal 16$b$ shown in FIG. 3(B). When there is negative radial tilt in the disk 7, it is the same as the track error signal 16$d$ shown in FIG. 3(C).

The phase difference between the output values V14$e$ and V14$g$ which is the track error signal (top-half of the track error signal) by diffracted light from the region 11$e$ of the diffractive optical element 3$e$ out of the sub-beam 1, and the phase difference between the output values V14$l$ and V14$j$ which is the track error signal (bottom-half of the track error signal) by diffracted light from the region 11$g$ of the diffractive optical element 3$e$ out of the sub-beam 2, are as follows.

When there is no radial tilt in the disk 7, it is the same as the track error signal 16$a$ shown in FIG. 3(A). When there is positive radial tilt in the disk 7, it is the same as the track error signal 16$c$ shown in FIG. 3(B). When there is negative radial tilt in the disk 7, it is the same as the track error signal 16$e$ shown in FIG. 3(C).

The phase difference between the output values V14$h$ and V14$f$ which is the track error signal (bottom-half of the track error signal) by diffracted light from the region 11$h$ of the diffractive optical element 3$e$ out of the sub-beam 1, and the phase difference between the output values V14$i$ and V14$k$ which is the track error signal (top-half of the track error signal) by diffracted light from the region 11$f$ of the diffractive optical element 3$e$ out of the sub-beam 2, are as follows.

When there is no radial tilt in the disk 7, it is the same as the track error signal 16$a$ shown in FIG. 3(A). When there is positive radial tilt in the disk 7, it is the same as the track error signal 16$e$ shown in FIG. 3(C). When there is negative radial tilt in the disk 7, it is the same as the track error signal 16$c$ shown in FIG. 3(B).

At this time, the sum of the phase differences between the output values V14$e$ and V14$g$, V14$l$ and V14$j$, V14$f$ and V14$h$, V14$k$ and V14$i$, which are the differences between the sum of the track error signals by the top-half of the sub-beam 1 and the bottom-half of the sub-beam 2 and the sum of the track error signals by the bottom-half of the sub-beam 1 and the top-half of the sub-beam 2, are as follows.

When there is no radial tilt in the disk 7, the sum is zero on the track. When there is positive radial tilt in the disk 7, the sum is positive on the track. When there is negative radial tilt in the disk 7, the sum is negative on the track.

Therefore, as the radial tilt signal, it is possible to use the differences between the sum of the track error signals of the top-half of the sub-beam 1 and the bottom-half of the sub-beam 2 and the sum of the track error signals of the bottom-half of the sub-beam 1 and the top-half of the sub-beam 2 at the time of applying track servo using the track error signal of the main beam.

Figure 5B:
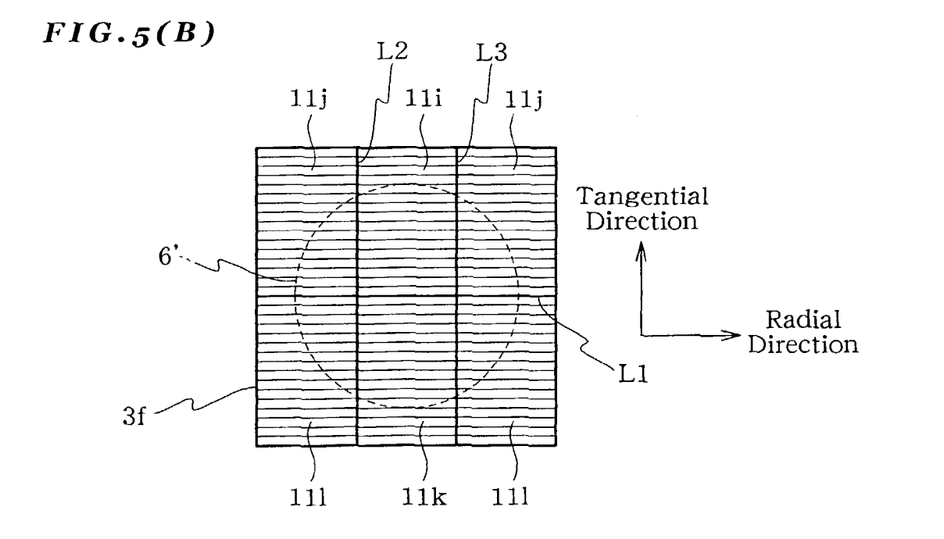
FIG. 5(B) is a plan view showing a diffractive optical element in a sixth embodiment of an optical head device according to the present invention.

In a sixth embodiment of an optical head device according to the present invention, the diffractive optical element 3$a$ in the first embodiment is replaced with a diffractive optical element 3$f$. FIG. 5(B) is a plan view showing the diffractive optical element 3$f$. The diffractive optical element 3$f$ has the following structure. Diffraction gratings, which are divided into two regions 11$i$, 11$k$ by a straight line L1 parallel to the radial direction of the disk 7 passing through the optical axis of the incident light, are formed inside a band with a width smaller than the effective diameter 6' of the objective lens 6 shown by a dotted line in the figure. Outside the band, diffraction gratings, which are divided into two regions 11$j$, 11$l$ by a straight line L1 parallel to the radial direction of the disk 7 passing through the optical axis of the incident light, are formed.

The direction of all the lattices in the diffraction gratings is parallel to the radial direction of the disk 7, and their pattern is in a linear form at even intervals. The cross section of each lattice is serrated. If the phase difference between the top and the bottom of the saw teeth is, for example, π, substantially 40.5% of the light which has entered the regions 11*i*, 11*l* transmits therethrough as 0th-order light and about 40.5% is diffracted thereby as +1st-order diffracted light. However, only about 4.5% is diffracted thereby as −1st-order diffracted light. Further, substantially 40.5% of the light which has entered the regions 11*j*, 11*k* transmits therethrough as 0th-order light and about 40.5% is diffracted thereby as −1st-order diffracted light. However, only about 4.5% is diffracted thereby as +1st-order diffracted light. The facing direction of the saw teeth in the regions 11*i*, 11*l* is so set that +1st-order diffracted light is deflected towards the upward direction in the figure, while the facing direction of the saw teeth in the regions 11*j*, 11*k* is so set that −1st-order diffracted light is deflected towards the downward direction in the figure.

Provided that +1st-order diffracted light from the diffractive optical element 3*f* is to be a sub-beam 1 and −1st-order diffracted light is to be a sub-beam 2, the main beam contains the light transmitted through the regions 11*i*, 11*j*, 11*k*, 11*l* by the same proportion. The sub-beam 1 mainly contains only the light diffracted by the regions 11*i*, 11*l*, while the sub-beam 2 mainly contains only the light diffracted by the regions 11*j*, 11*k*. As a result, distributions of the light intensity for the main beam, the sub-beam 1, and the sub-beam 2 differ when making incidence on the objective lens 6. The peripheral light intensity in the top-half of the sub-beam 1 in the radial direction of the disk 7 is lower than that of the main beam, while the bottom-half in the radial direction of the disk 7 is higher. The peripheral light intensity in the top-half of the sub-beam 2 in the radial direction of the disk 7 is higher than that of the main beam, while the bottom-half in the radial direction of the disk 7 is lower. The sum of the light intensity distributions of the sub-beam 1 and the sub-beam 2 equals to the light intensity distribution of the main beam.

The configuration of the focused spots on the disk 7 according to the embodiment is substantially the same as that shown in FIG. 2(A). However, the diameter of the focused spots as the sub-beams and that of the focused spot as the main beam are substantially the same.

The pattern of the light receiving sections of the photodetector 10*a* and the configuration of the light spots on the photodetector 10*a* according to the embodiment are substantially the same as those shown in FIG. 2(B). However, in the left-half of the light spot as the sub-beam 1, the peripheral light intensity in the radial direction of the disk 7 is lower than that of the light spot as the main beam, while the peripheral light intensity in the right-half in the radial direction of the disk 7 is higher. In the left-half of the light spot as the sub-beam 2, the peripheral light intensity in the radial direction of the disk 7 is higher than that of the light spot as the main beam, while the peripheral light intensity in the right-half in the radial direction of the disk 7 is lower.

In the sixth embodiment, the focus error signal, the track error signal, and the RF signal are obtained by the same method described in the first embodiment. Further, in the sixth embodiment, it is possible to detect the radial tilt of the disk 7 by the same method described in the fifth embodiment.

In the fifth and sixth embodiments, when there is residual error, caused by eccentricity of the disk 7 and the like, in the track error signal used for applying track servo, offset due to the residual error is also generated in the track error signal by the top-half of the sub-beam 1 and the bottom-half of the sub-beam 2, and in the track error signal by the bottom-half of the sub-beam 1 and the top-half of the sub-beam 2.

However, the difference of the both is used as the radial tilt signal so that the offset due to the residual error is canceled. Therefore, it is possible to detect radial tilt without generating offset caused by the residual error.

Figure 6:
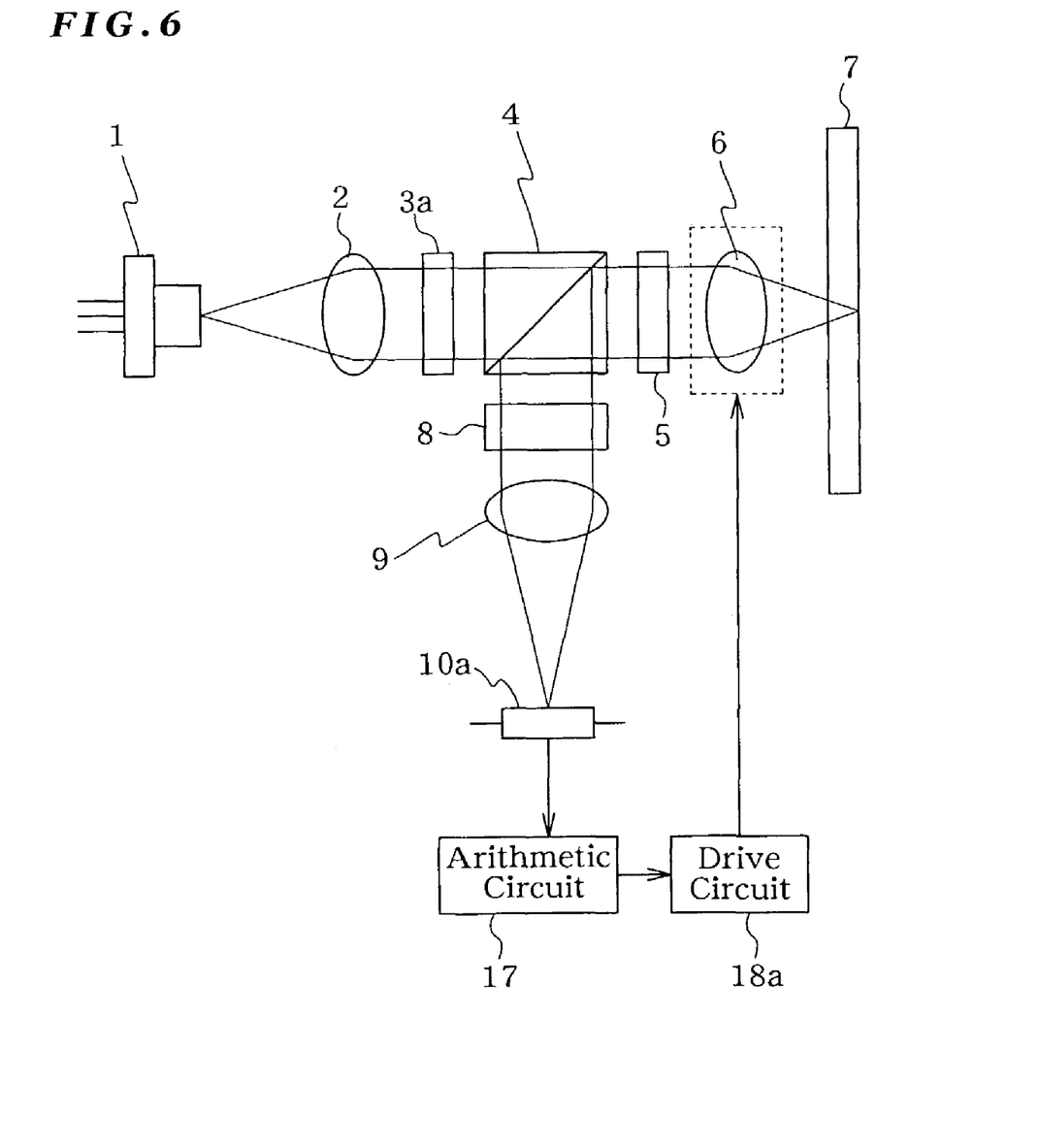
FIG. 6 is a block diagram showing a first embodiment of an optical information recording/reproducing device according to the present invention.

FIG. 6 shows a first embodiment of an optical information recording/reproducing device according to the present invention. In the embodiment, an arithmetic circuit 17 and a drive circuit 18*a* are added to the optical head device in the first embodiment of the present invention shown in FIG. 1(A). The arithmetic circuit 17 calculates radial tilt signal based on the output from each light receiving section of the photodetector 10*a*. The drive circuit 18*a* tilts the objective lens 6 within a dotted line in the figure towards the radial direction of the disk 7 by an actuator (not shown) so that the radial tilt signal becomes zero.

Thereby, the radial tilt of the disk 7 is corrected so that there is no adverse effect on the recording/reproducing characteristics.

Figure 7:
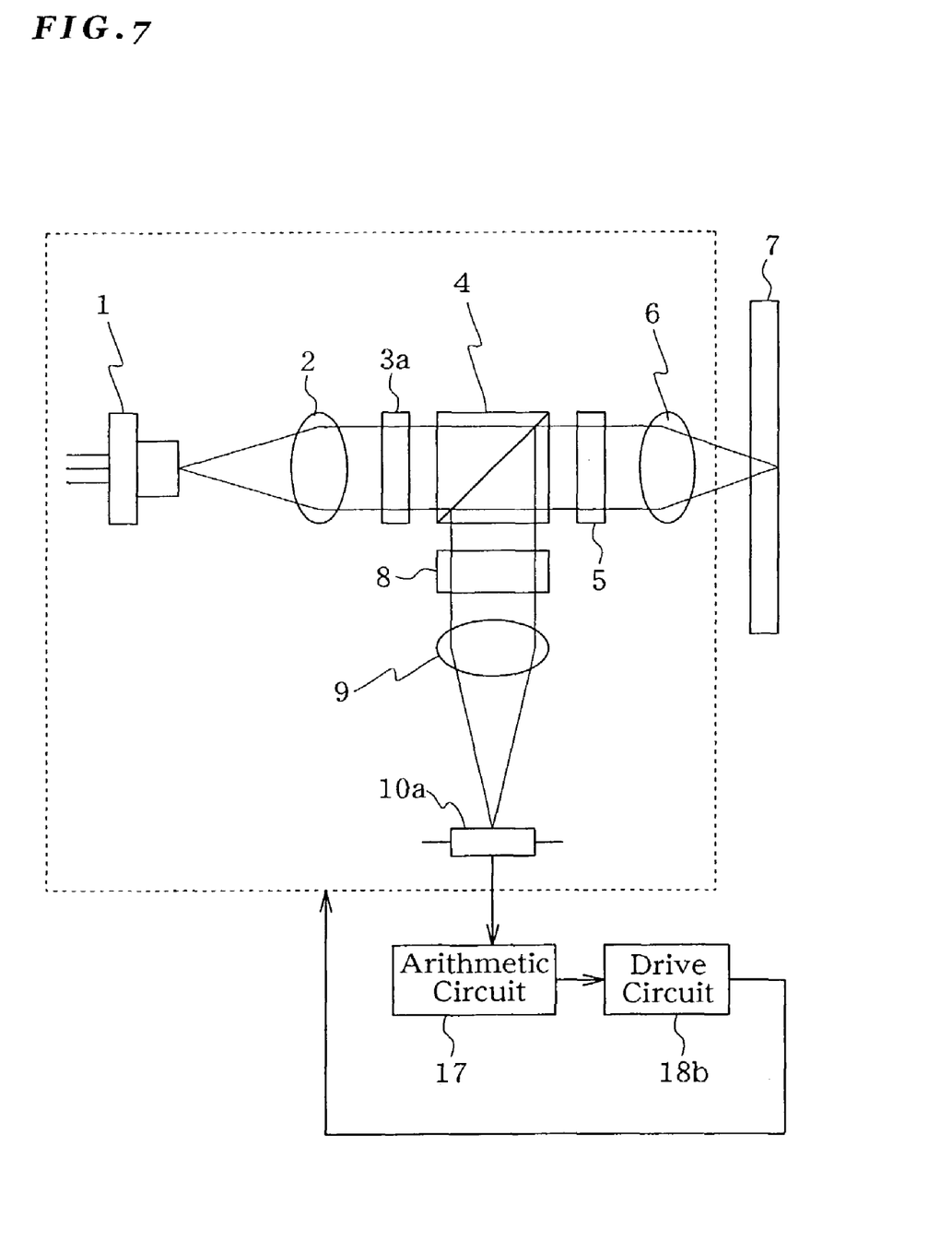
FIG. 7 is a block diagram showing a second embodiment of an optical information recording/reproducing device according to the present invention.

FIG. 7 shows a second embodiment of an optical information recording/reproducing device according to the present invention. In the embodiment, an arithmetic circuit 17 and a drive circuit 18*b* are added to the optical head device in the first embodiment of the present invention shown in FIG. 1(A). The arithmetic circuit 17 calculates radial tilt signal based on the output from each light receiving section of the photodetector 10*a*. The drive circuit 18*b* tilts the whole portion of the optical head device within a dotted line in the figure towards the radial direction of the disk 7 by a motor (not shown) so that the radial tilt signal becomes zero.

Thereby, the radial tilt of the disk 7 is corrected so that there is no adverse effect on the recording/reproducing characteristics.

Figure 8:
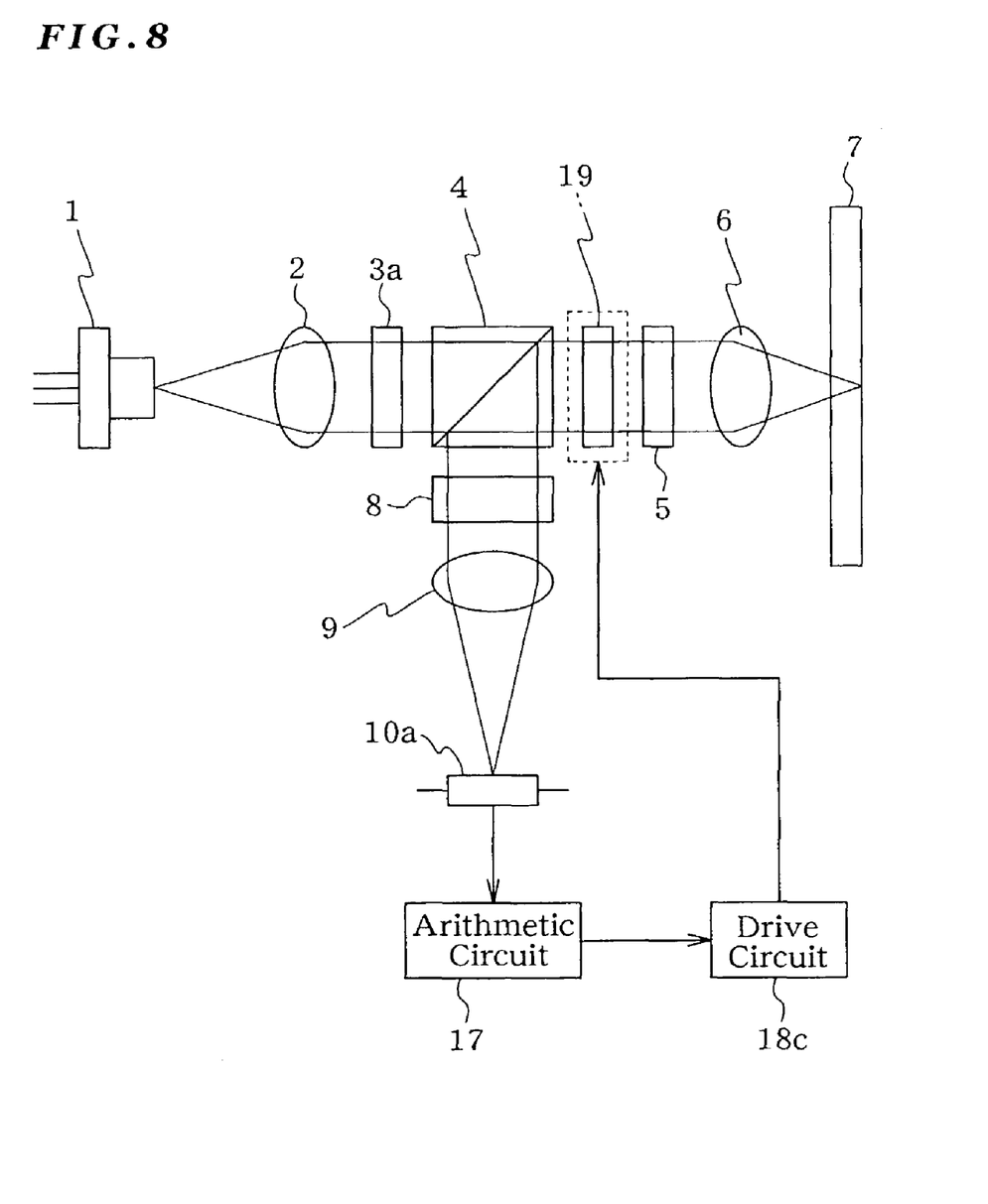
FIG. 8 is a block diagram showing a third embodiment of an optical information recording/reproducing device according to the present invention.

FIG. 8 shows a third embodiment of an optical information recording/reproducing device according to the present invention. In the embodiment, an arithmetic circuit 17, a drive circuit 18*c*, and a liquid crystal optical element 19 are added to the optical head device in the first embodiment of the present invention shown in FIG. 1(A). The arithmetic circuit 17 calculates radial tilt signal based on the output from each light receiving section of the photodetector 10*a*. The drive circuit 18*c* applies voltage to the liquid crystal optical element 19 within a dotted line in the figure so that the radial tilt signal becomes zero. The liquid crystal optical element 19 is divided into a plurality of regions (not shown), and by altering the voltage to be applied to each region, coma aberration for the transmitted light varies.

Thus, by adjusting the voltage to be applied to the liquid crystal optical element 19, coma aberration is generated in the liquid crystal optical element 19 so as to cancel the coma aberration caused by radial tilt of the disk 7. Thereby, the radial tilt of the disk 7 is corrected so that there is no adverse effect on the recording/reproducing characteristics.

As another embodiment of the optical information recording/reproducing device according to the present invention, an arithmetic circuit, a drive circuit and the like may be added to the second to sixth embodiments of the optical head device according to the present invention.

As described heretofore, the optical head device of the present invention comprises a light source, an objective lens for focusing light emitted from the light source on an optical recording medium, and a photodetector for receiving the reflected light from the optical recording medium. In the device, main beam and sub-beams with different light intensity distributions when making incidence on the objective lens are used to detect the track error signal by the differential phase detection method, thereby detecting the radial tilt of the optical recording medium according to the phase shift of the track error signal by the main beam and that by the sub-beams. Further, an optical information recording/reproducing device of the present invention comprises the optical head device of the present invention described above, thereby correcting the radial tilt of the optical recording medium.

An effect of the optical head device and the optical information recording/reproducing device is to be able to obtain the excellent signal to noise ratio of the RF signal. The reason is that the main beam used for detecting the RF signal from the optical recording medium, can be received by four light receiving sections. Therefore, the number of current-voltage conversion circuits for the main beam is the same as that in an ordinary optical head device which does not detect radial tilt. Thus, there is no increase in the noise caused by the circuit.

The invention may be embodied in other specific forms without departing from the spirit or essential characteristic thereof. The present embodiments are therefore to be considered in all respects as illustrative and not restrictive, the scope of the invention being indicated by the appended Claims rather than by the foregoing description and all changes which come within the meaning and range of equivalency of the Claims are therefore intended to be embraced therein.

The entire disclosure of Japanese Patent Application No. 2002-149074 (Filed on May 23, 2002) including specification, claims, drawings and summary are incorporated herein by reference in its entirety.

What is claimed is:

1. An optical information reproducing device, comprising:
a light source for emitting light;
a diffractive optical element for dividing light emitted from the light source into at least a main beam, a first sub-beam, and a second sub-beam;
an objective lens for focusing the main beam, the first sub-beam, and the second sub-beam onto a same track of a read-only type optical recording medium;
a photodetector for receiving light reflected by the read-only type optical recording medium, the photodetector including a first light receiving section for receiving the main beam in four divided portions, a second light receiving section for receiving the first sub-beam in four divided portions, and a third light receiving section for receiving the second sub-beam in four divided portions;
circuitry for calculating a track error signal of the main beam using a differential phase detection method based on outputs from the first light receiving section, and for calculating a track error signal of the first and second sub-beams using the differential phase detection method based on outputs from the second and third light receiving sections, and for calculating a radial tilt signal based on the track error signal of the main beam and the track error signal of the first and second sub-beams; and
correcting means for correcting a radial tilt of the optical recording medium;
wherein the first light receiving section and the second and third light receiving sections output signals for calculating track error signals by the differential phase detection method;
wherein the diffractive optical element is for generating the main beam and the first and second sub-beams with different light intensity distributions when making incidence to the objective lens;
wherein the diffractive optical element outputs 0th-order light as the main beam and ±1st-order diffracted lights as the first and second sub-beams;
wherein the circuitry is configured to calculate the track error signal of the main beam by calculating a phase difference between a sum of two outputs of the first light receiving section and a sum of two other outputs of the first light receiving section; and
wherein the circuitry is configured to calculate the track error signal of the first and second sub-beams by calculating a first phase difference between a sum of two outputs of the second light receiving section and a sum of two other outputs of the second light receiving section, and by calculating a second phase difference between a sum of two outputs of the third light receiving section and a sum of two other outputs of the third light receiving section, and by calculating a sum of the first phase difference and the second phase difference.

2. The optical information reproducing device according to claim 1, wherein the correcting means corrects the radial tilt of the optical recording medium by tilting the objective lens towards a radial direction of the optical recording medium.

3. The optical information reproducing device according to claim 1, wherein the correcting means corrects the radial tilt of the optical recording medium by tilting the whole portion of the optical head device including the light source, the diffractive optical element, the objective lens, and the photodetector towards a radial direction of the optical recording medium.

4. The optical information reproducing device according to claim 1, wherein the correcting means comprises a liquid crystal optical element between the light source and the objective lens so as to correct the radial tilt of the optical recording medium by applying a voltage to the liquid crystal optical element.

* * * * *